United States Patent Office 3,367,936
Patented Feb. 6, 1968

3,367,936
4-(PIPERAZINOALKYL)-PYRAZOLES
Volker Koppe, Karl Schulte and Helmut Muller-Calgan, Darmstadt, Germany, assignors to E. Merck A.G., Darmstadt, Germany
No Drawing. Filed Nov. 3, 1965, Ser. No. 506,260
Claims priority, application Germany, Nov. 4, 1964, M 62,985; Feb. 9, 1965, M 64,086
21 Claims. (Cl. 260—268)

This invention relates to the preparation of novel pyrazole derivatives, and particularly to those having an effect on the nervous system of mammals.

Thus, the principal object of this invention is to provide novel pyrazole derivatives.

Another object is to provide processes for their preparation.

Further objects of this invention includes pharmaceutical compositions and methods of administering the same, based on the novel derivatives of this invention.

Upon further study of the specification and claims other objects and advantages of the present invention will become apparent.

To attain the objects of this invention, there are provided the 4-(piperazinoalkyl)-pyrazoles of Formula I, as follows:

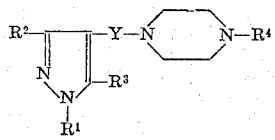

wherein $R^1$ is H, alkyl of 1–4 carbon atoms, aralkyl of 7–10 carbon atoms, or Ar, $R^2$ and $R^3$, being identical or different, represent H or alkyl of 1–4 carbon atoms, $R^4$ is alkyl of 1–6 carbon atoms, cycloalkyl, and cycloalkenyl of 5–7 carbon atoms each, aralkyl of 7–10 carbon atoms, Ar or a five- or six-membered heterocyclic residue of a total of 3–10 carbon atoms and substituted derivatives thereof having as substituents members selected from the group consisting of 1–3 lower alkyl or alkoxy groups; a benzene ring condensed therewith the heterocyclic residue condensed with the benzene ring having optionally substituted on the heterocyclic ring 1–3 members selected from the group consisting of lower alkyl and alkoxy groups, Ar is aryl of a total of 6–12 carbon atoms and substituted derivatives thereof having as substituents, 1–3 members selected from the group consisting of lower alkyl, lower alkoxy, phenyl, hydroxy, lower alkyl-mercapto, trifluoromethyl groups, halogen atoms, and a methylene dioxy group, and Y is a straight-chained or branched hydrocarbon residue of 1–10, preferably 1 to 4 carbon atoms, as well as their acid addition salts.

The above compounds possess valuable pharmacological properties. Mainly, these compounds have an effect upon the nervous system, particularly exhibiting a narcosis-potentiating, sedative, tranquilizing, hypnotic, and narcotic effect. Furthermore, with a number of these compounds, there were also observed blood-pressure lowering, analgesic, antiphlogistic and/or locally anesthetic properties.

The blood-pressure lowering effect is due to the vasodilator type character of the compounds.

The narcosis-potentiating effect of some of the compounds has been tested as follows:

10 female rats (weight 130 to 280 g.) are orally fed graded quantities of the test substances (suspended in a solution of gum arabic), after having been held without food for 20 hours. Simultaneously, a group of 10 control animals receives orally a 5% gum arabic solution. After 45 minutes, all animals receive hexobarbital-sodium intravenously (20 mg./kg.). The animals are positioned on their backs on heated troughs. The duration of narcosis of the animals is determined with the aid of two criteria (head rising and turning from supine to prone position), and this duration of narcosis of the two groups of animals is compared. The definition for the minimal effective dosage of the test substances is the lowest dosage at which a distinct difference in effect occurs in comparison to the control animals (ensured statistically by means of the Mann-Whitney test).

The sedative and hypnotic effect on cats has been determined according to Arzneimittelforschung, vol. 11, p. 642 (1961), the sedative and tranquilizing effect on Rhesus monkeys according to J. Pharmacol. Exptl. Therap., vol. 127, pp. 55–56 (1959), and Behavior, vol. 16, p. 74 (1960).

In comparison with Revonal® [2-methyl-3-o-tolyl-4-(3H)-quinazolinone], the compounds 4-[3-(N'-phenyl-piperazino)-propyl]-pyrazole (Ia) and 4-[2-(N'-phenyl-piperazino)-ethyl]-pyrazole (Ib) administered orally to rats, possessed a strong potentiating effect upon hexobarbital narcosis equal to that attained by the administration of Revonal®, a brand of 2-methyl-3-o-tolyl-4-(3H)-quinazolinone, in dosages 25 times smaller. In oral administrations to cats, the compound Ia had the same sedative and hypnotic effect at a dosage level 10 times smaller than that employed with Revonal®, and when Ia was fed to Rhesus monkeys, it had the same sedative and tranquilizing effect as Revonal® at a dosage level 8 times as small. In these tests, Ia and Ib exhibited good physiological compatibility without any harmful side effects.

The 4-(piperazinoalkyl)-pyrazoles of Formula I can be prepared by the following alternative reaction techniques:

(A) A compound of Formula II

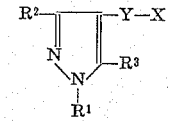

wherein

X represents Cl, Br, I, OH, acyloxy of 1–6 carbon atoms, alkylsulfonyloxy of 1–6 carbon atoms, alkoxy of 1–6 carbon atoms, or arylsulfonyloxy of 6–10 carbon atoms, is reacted with a compound of Formula III

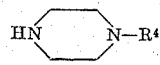

(B) A compound of Formula IV

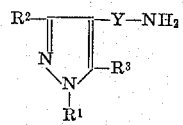

is reacted with a compound of Formula V

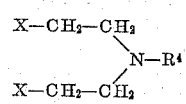

wherein the two groups X can also represent together an oxygen atom, (C) A compound of Formula VI

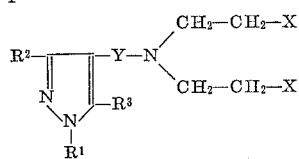

VI wherein the two groups X can also represent together an oxygen atom, is reacted with a compound of Formula VII

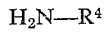 VII (D) A compound of Formula VIII

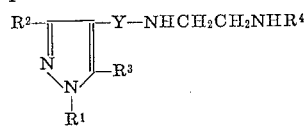

VIII is reacted with a compound of Formula IX

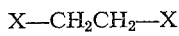 IX or (E) A compound of Formula X

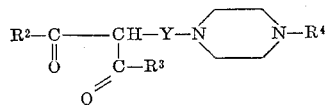 X is reacted with a compound of Formula XI

 XI (F) A compound embraced by Formula I but having attached thereto a moiety replaceable by hydrogen and/or said compound having an unsaturated carbon to carbon linkage is reacted with hydrogen or a compound capable of yielding hydrogen.

(The expression "moiety replaceable by hydrogen" refers especially to halogen atoms, preferably chlorine or bromine atoms, also to keto, hydroxy, and benzyl groups.)

(G) An addition salt of a compound embraced by Formula I is liberated by the addition of a base.

By the use of acids it is also possible to convert the compounds of Formula I into physiologically compatible acid addition salts.

In Formulae II to XI, $R^1$ to $R^4$, Ar, X, and Y have the same meaning as indicated above for Formula I.

Alkyl groups which can be employed in the residues $R^1$ to $R^4$ and Ar are the following: methyl, ethyl, n-propyl, isopropyl, n-butyl, isobutyl, furthermore sec. butyl and tert. butyl. $R^4$ can also be, for example, n-amyl, isoamyl, 2-methylbutyl-(1), pentyl-(2), pentyl-(3), 3-methylbutyl-(2), neopentyl, tert. amyl, n-hexyl, isohexyl, cyclopentyl, cyclohexyl, cycloheptyl, cyclohexen-(1)-yl, cyclohexen-(2)-yl, or cyclohexen-(3)-yl.

The aralkyl groups in residues $R^1$ and $R^4$ include the following: benzyl, o-, m-, and p-methylbenzyl, 1- and 2-phenylethyl, 3-phenylpropyl, 4-phenylbutyl.

The expression heterocyclic residue is intended to mean that all of the possible rings each contain as a member of the ring one or two heterocyclic atoms, preferably one sulfur and/or one nitrogen atom or two nitrogen atoms.

The aromatic heterocyclic residues preferably have the benzene ring condensed at the 4,5 position on the heterocyclic ring with respect to the number one heterocyclic atom. It is also preferred to substitute the lower alkyl and alkoxy groups at the 1, 3, 4, 5, or 6 position with respect to the number one heterocyclic atom.

Heterocyclic residues can be, for example:

2- or 3-thienyl,
2-, 3-, or 4-pyridyl,
2-, 4-, or 5-thiazolyl,
1-, 3-, 4-, or 5-pyrazolyl,
2-pyrimidinyl,
2-benzimidazolyl,
2-benzoxazolyl,
pyrazinyl,
3-pyridazinyl, and further residues such as 6-methoxy-2-pyridyl 4-methyl-2-thiazolyl or 1,3,5-trimethyl-4-pyrazolyl, furthermore 3-, 4- or 5-isothiazolyl, 2- or 3-benzothienyl, 2-quinoxalyl.

The residue Ar represents preferably phenyl,
o-, m-, or p-tolyl,
2,4-dimethylphenyl,
o-, m-, or p-ethylphenyl,
p-isopropylphenyl,
2-methyl-5-isopropylphenyl,
o-, m-, or p-phenylphenyl,
o-, m-, or p-methoxyphenyl,
3,4-dimethoxyphenyl,
3,4,5-trimethoxyphenyl,
2-methoxy-5-methylphenyl,
o-, m-, or p-ethoxyphenyl,
3,4-methylenedioxyphenyl,
o-, m-, or p-hydroxphenyl,
3,4-dihydroxyphenyl,
o-, m-, or p-methylmercaptophenyl,
o-, m-, or p-ethylmercaptophenyl,
o-, m-, or p-trifluoromethylphenyl,
o-, m-, or p-fluorophenyl,
o-, m-, or p-chlorophenyl,
2,3-, 2,4-, 2,5-, 2,6-, 3,4-, or 3,5-dichlorophenyl,
2,4,6-trichlorophenyl,
o-, m-, or p-bromophenyl,
2,4-dibromophenyl,
o-, m-, or p-iodophenyl.

It is also possible to utilize, under reducing conditions, starting materials corresponding to Formulae II, V, VI, or IX, with the provision that they contain in place of one or two $CH_2X$, where X represents Cl, Br, I, or OH, preferably acetoxy, methanesulfonyloxy, p-toluenesulfonyloxy, or methoxy, groups selected from aldehyde, ester, or other groups of higher oxidation stages which are reduced to OH under the reaction conditions.

The group Y preferably represents $-(CH_2)_n-$, the number $n$ being 1–10, and preferably 1 to 4. In addition to methylene, ethylene, propylene, butylene, pentylene, and hexylene residues, it is also possible to employ the following residues:

$-CHCH_3-$,
$-CH(CH_3)CH_2-$,
$-CH_2CH(CH_3)-$,
$-CH(CH_3)CH_2CH_2-$,
$-CH_2CH(CH_3)CH_2-$,
$-CH_2CH_2CH(CH_3)-$,
$-CH(C_2H_5)CH_2-$,
$-CH_2CH(C_2H_5)-$,
$-CH(n-C_3H_7)-$,
$-CH(iso-C_3H_7)-$,
$-CH(CH_3)CH_2CH_2CH_2-$,
$-CH_2CH(CH_3)CH_2CH_2-$,
$-CH_2CH_2CH(CH_3)CH_2-$,
$-CH_2CH_2CH_2CH(CH_3)-$,
$-CH(C_2H_5)CH_2CH_2-$,
$-CH_2CH(C_2H_5)CH_2-$,
$-CH_2CH_2CH(C_2H_5)-$,
$-CH(n-C_3H_7)CH_2-$,
$-CH_2CH(n-C_3H_7)-$,
$-CH(iso-C_3H_7)CH_2-$,
$-CH_2CH(iso-C_3H_7)-$,
$-CH(n-C_4H_9)-$,
$-CH(iso-C_4H_9)-$,
$-CH(sec.-C_4H_9)-$,
$-CH(tert.-C_4H_9)-$,
$-CH(CH_3)CH_2CH_2CH_2CH_2-$,
$-CH_2CH(CH_3)CH_2CH_2CH_2-$,
$-CH_2CH_2CH(CH_3)CH_2CH_2-$,

—CH₂CH₂CH₂CH(CH₃)CH₂—,
—CH₂CH₂CH₂CH₂CH(CH₃)—.

The compounds of Formula I are preferably obtained by reacting 4-(ω-halogenoalkyl)-pyrazoles, or the analogs thereof of Formula II, with 1-substituted piperazine of Formula III.

Starting compounds of Formula II particularly suitable are the following pyrazoles:

4-(ω-chloroalkyl)-,
4-(ω-bromoalkyl)-,
4-(ω-iodoalkyl)-,
4-(ω-hydroxyalkyl)-, as well as the esters thereof, particularly the methane- and p-toluene-sulfonates, 1-methyl-4-(ω-chloroalkyl)-,
1-methyl-4-(ω-bromoalkyl)-,
1-ethyl-4-(ω-chloroalkyl)-,
1-phenyl-4-(ω-chloroalkyl)-,
1-benzyl-4-(ω-chloroalkyl)-,
1-n-propyl-4-(ω-chloroalkyl)-, and
1-isopropyl-4-(ω-chloroalkyl)pyrazoles, in detail for example the following:

4-chloromethyl-,
4-bromomethyl-,
4-iodomethyl-,
4-hydroxymethyl-, as well as the esters thereof, particularly the methane- and p-toluenesulfonates thereof, 1-methyl-4-chloromethyl-,
1-methyl-4-bromomethyl-,
1-ethyl-4-chloromethyl-,
1-phenyl-4-chloromethyl-,
1-benzyl-4-chloromethyl-,
1-n-propyl-4-chloromethyl-,
1-isopropyl-4-chloromethyl-,
4-(2-chloroethyl)-,
4-(2-bromoethyl)-,
4-(2-iodoethyl)-,
4-(2-hydroxyethyl)-, as well as the esters thereof, particularly the methane- and p-toluenesulfonates thereof, 1-methyl-4-(2-chloroethyl)-,
1-methyl-4-(2-bromoethyl)-,
1-ethyl-4-(2-chloroethyl)-,
1-phenyl-4-(2-chloroethyl)-,
1-benzyl-4-(2-chloroethyl)-,
1-n-propyl-4-(2-chloroethyl)-,
1-isopropyl-4-(2-chloroethyl)-,
4-(1-chloroethyl)-,
4-(1-bromoethyl)-,
1-methyl-4-(1-chloroethyl)-,
1-ethyl-4-(1-chloroethyl)-,
1-benzyl-4-(1-chloroethyl)-,
4-(3-chloropropyl)-,
4-(3-bromopropyl)-,
4-(3-iodopropyl)-,
4-(3-hydroxypropyl)- as well as the esters thereof, particularly the methane- and p-toluene-sulfonates thereof, 1-methyl-4-(3-chloropropyl)-,
1-methyl-4-(3-bromopropyl)-,
1-ethyl-4-(3-chloropropyl)-,
1-phenyl-4-(3-chloropropyl)-,
1-benzyl-4-(3-chloropropyl)-,
1-n-propyl-4-(3-chloropropyl)-,
1-isopropyl-4-(3-chloropropyl)-,
4-(1-chloropropyl-2)-,
4-(1-bromopropyl-2)-,
4-(1-hydroxypropyl-2)-, as well as the esters thereof, 1-methyl-4-(1-chloropropyl-2)-,
1-benzyl-4-(1-chloropropyl-2)-,
4-(2-chloropropyl)-,
4-(2-bromopropyl)-,
4-(2-hydroxypropyl)-, as well as the esters thereof, 1-methyl-4-(2-chloropropyl)-,
1-benzyl-4-(2-chloropropyl)-,
4-(4-chlorobutyl)-,
4-(4-bromobutyl)-,
4-(4-iodobutyl)-,
4-(4-hydroxybutyl)-, as well as the esters thereof, particularly the methane- and p-toluene-sulfonates thereof, 1-methyl-4-(4-chlorobutyl)-,
1-methyl-4-(4-bromobutyl)-,
1-ethyl-4-(4-chlorobutyl)-,
1-phenyl-4-(4-chlorobutyl)-,
1-benzyl-4-(4-chlorobutyl)-,
4-(5-chloropentyl)-,
4-(5-bromopentyl)-,
4-(5-iodopentyl)-,
4-(5-hydroxypentyl)- as well as the esters thereof, 1-methyl-4-(5-chloropentyl)-,
1-methyl-4-(5-bromopentyl)-,
1-ethyl-4-(5-chloropentyl)-,
1-phenyl-4-(5-chloropentyl)-,
1-benzyl-4-(5-chloropentyl)-,
4-(6-chlorohexyl)-,
4-(6-bromohexyl)-,
4-(6-hydroxyhexyl)-, as well as the esters thereof, 1-methyl-4-(6-chlorohexyl)-,
1-benzyl-4-(6-chlorohexyl)-,
4-(7-chloroheptyl)-,
4-(7-bromoheptyl)-,
4-(7-hydroxyheptyl)-, as well as the esters thereof, 1-methyl-4-(7-chloroheptyl)-,
1-benzyl-4-(7-chloroheptyl)-,
4-(8-chlorooctyl)-,
4-(8-bromooctyl)-,
4-(8-hydroxyoctyl)-, as well as the esters thereof, 1-methyl-4-(8-chlorooctyl)-,
1-benzyl-4-(8-chlorooctyl)-,
4-(9-chlorononyl)-,
4-(9-bromononyl)-,
4-(9-hydroxynonyl)-, as well as the esters thereof, 1-methyl-4-(9-chlorononyl)-,
1-benzyl-4-(9-chlorononyl)-,
4-(10-chlorodecyl)-,
4-(10-bromodecyl)-,
4-(10-hydroxydecyl)-, as well as the esters thereof, 1-methyl-4-(10-chlorodecyl)- and
1-benzyl-4-(10-chlorodecyl)-pyrazole.

The following piperazines can be compounds of Formula III:

N-methyl-,
N-ethyl-,
N-n-propyl-,
N-isopropyl-,
N-n-butyl-,

N-isobutyl-,
N-sec. butyl-,
N-tert. butyl-,
N-n-amyl-,
N-isoamyl-,
N-n-hexyl-,
N-isohexyl-,
N-cyclopentyl-,
N-cyclohexyl-,
N-cyclohexen-(2)- or -(3)-yl,
N-benzyl-,
N-phenyl-,
N-o-tolyl-,
N-m-tolyl-,
N-p-tolyl-,
N-p-ethylphenyl-,
N-p-phenylphenyl-,
N-o-methoxyphenyl-,
N-m-methoxyphenyl-,
N-p-methoxyphenyl-,
N-(3,4-methylenedioxyphenyl)-,
N-o-hydroxyphenyl-,
N-m-hydroxyphenyl-,
N-p-hydroxyphenyl-,
N-o-trifluoromethylphenyl-,
N-m-trifluoromethylphenyl-,
N-p-trifluoromethylphenyl-,
N-o-fluorophenyl-,
N-m-fluorophenyl-,
N-p-fluorophenyl-,
N-o-chlorophenyl-,
N-m-chlorophenyl-,
N-p-chlorophenyl-,
N-o-bromophenyl-,
N-m-bromophenyl-,
N-p-bromophenyl-,
N-o-iodophenyl-,
N-m-iodophenyl-,
N-p-iodophenyl-,
N-1-naphthyl-,
N-2-naphthyl-,
N-2-thienyl-,
N-3-thienyl-,
N-2-pyridyl-,
N-3-pyridyl-,
N-4-pyridyl-,
N-(6-methoxy-2-pyridyl)-,
N-2-thiazolyl-,
N-(4-methyl-2-thiazolyl)-, and
N-1,3,5-trimethyl-4-pyrazolyl)-piperazine.

The compounds of Formulae II and III are either known, or they can be readily synthesized by methods known to the art. For example, pyrazole-4-aldehydes can be converted to the corresponding hydroxy compounds by reduction, or by reaction with organometallic compounds. The hydroxy groups on these compounds can be conventionally esterified or substituted with chlorine or bromine. When using thionyl chloride, for example, there are obtained the hydrochlorides of II (X=Cl, Y=CH$_2$).

Furthermore, 2,3-dihydrofuran or 2,3-dihydropyran can be converted, by subsequent reactions with orthoformic acid ester/boron trifluoride and hydrazine or substituted hydrazines, respectively, into 4-(2-hydroxyethyl)- or 4-(3-hydroxypropyl)-pyrazoles, respectively, substituted in the 1-position, if desired. Higher pyrazoles of Formula II can be obtained by chain-lengthening reactions from lower pyrazoles of Formula II. For example, 4-(3-halopropyl)-pyrazoles yield, when reacted with alkali cyanide, the corresponding nitriles; the latter are converted, by successive reaction with ethanol and sulfuric acid, reduction of the obtained esters to form the 4-(4-hydroxybutyl)-pyrazoles, and substitution of the hydroxy group by chlorine or bromine, into the homologous 4-(4-halobutyl)-pyrazoles. 4-(5-halopentyl)-pyrazoles are obtained from the 4-(3-halopropyl)-pyrazoles by reaction with malonic ester and subsequent saponification, decarboxylation, reesterification, an analogous successive reactions as above. If monoalkylated malonic esters are the starting material, compounds are produced having a branched carbon chain. The piperazines of Formula III can be obtained by reacting the amines of Formula VII with diethanolamine, morpholine, or bis(2-chloroethyl)-amine, or also from piperazine and halogen compounds, preferably bromides, of the Formula X—R$^4$.

The reaction of compounds II and III is conducted according to methods known from the literature for the alkylation of amines. The reaction is conducted without solvents by melting the components together, or also in the presence of an inert solvent, such as benzene, toluene, xylene, ketones, such as acetone, or butanone, alcohols, such as methanol, ethanol, tetrahydrofuran, or dioxane. If desired, mixtures of these solvents with one another or with water may be used. It is also advantageous to add an acid-neutralizing agent, for example a hydroxide, carbonate, bicarbonate, or another salt of a weak acid of the alkali or alkaline earth metals, preferably that of sodium, potassium, or calcium, of an organic base such as triethylamine, dimethyl aniline, pyridine, or quinoline, or an excess of the piperazine derivative of Formula III. The reaction time ranges, depending upon the conditions employed between a few minutes and 14 days; the reaction temperature ranges from 0 to 200° C., and is preferably between 100 and 130° C. If the reaction is conducted at about 120° C. without solvents, the reaction is terminated within about ½ to 2 hours. When using solvents, it is sometimes necessary to heat the reaction mixture for 12–24 hours in order to obtain better yields.

In a variant of the above-described method, an aldehyde of Formula XII

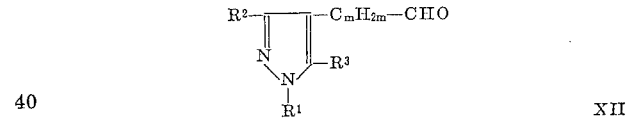

wherein $m$ is a number from 0 to 9, can be reacted with piperazines of Formula III under catalytic hydrogenation conditons. The reaction conditions correspond to those known from the literature for reductive alkylations. The aldehydes XII can be obtained by oxidation of the corresponding primary alcohols in Formula II (X=OH).

The compounds of Formula I are furthermore obtainable by reacting a 4-(ω-aminoalkyl)-pyrazole of Formula IV with a nitrogen-lewisite compound of Formula V.

The 4-(ω-aminoalkyl)-pyrazoles can be produced from the above-mentioned 4-(ω-haloalkyl)-pyrazoles of Formula II by the reaction thereof with ammonia or phthalimide-potassium; chiefly, the following compounds can be employed: 4-aminomethylpyrazole, 4-(2-aminoethyl)-pyrazole, 4-(3-aminopropyl)-pyrazole, 4-(4-aminobutyl)-pyrazole, 4-(5-aminopentyl)-pyrazole, 4-(6-aminohexyl)-pyrazole, as well as the 1-methyl-, 1-ethyl-, 1-benzyl-, 1-phenyl-, and 1,3,5-trimethyl-derivatives of these compounds.

Particularly, the following are recited as starting compounds of Formula V: bis-(2-chloroethyl)-methylamine and other lower bis-(2-chloroethyl)-alkylamines, bis-(2-chloroethyl)-aniline, bis-(2-bromoethyl)-aniline, and N-phenylmorpholine, as well as the derivatives of these compounds which are substituted in the aromatic nucleus analogously to the above-described piperazines of Formula III.

Conversely, it is also possible to react, for producing the compounds of Formula I, nitrogen-lewisite compounds of Formula VI (produced for example by reaction of the 4-(ω-haloalkyl)-pyrazoles of Formula II with diethanolamine, or of the amines IV with ethylenechlorohydrin, or with ethylene oxide and subsequent conversion of the hydroxy groups into halogen atoms, for example with thionyl chloride) with amines of Formula VII under similar conditions. Compounds of Formula VI are, for example, the following: 4-(bis-(2-chloroethyl)-amino)-methyl-, 4-[2-(bis-(2-chloroethyl)-amino)-ethyl]-, 4-[3-(bis-(2-chloroethyl) - amino) - propyl]-, 4 - [4-(bis-(2-chloroethyl)-amino)-butyl]-, 4-[5-(bis-(2 - chloroethyl)-amino)-pentyl]-, 4-[6-(bis - (2 - chloroethyl) - amino)-hexyl]-, and 4-[10-(bis-(2-chloroethyl) - amino)-decyl]-pyrazole, as well as the 1-methyl, 1-benzyl-, and 1-phenyl-derivatives thereof; the corresponding bis-(2-bromoethyl) compounds, as well as the 4-(morpholinomethyl)-, 4-(2-morpholinoethyl)-, 4-(3-morphilinopropyl)-, 4-(4-morpholinobutyl)-, 4-(5-morpholinopentyl)-, 4-(6-morpholinohexyl)-, 4-(7-morpholinoheptyl)-, 4-(8-morpholinooctyl)-, 4-(9-morpholinononyl)-, and 4-(10-morpholinodecyl)-pyrazole, (easily obtainable by a conventional N-alkylation reaction from the corresponding 4-(ω-chloroalkyl)-pyrazoles and morpholine), and the 1-methyl-, 1-benzyl-, and 1-phenyl-derivatives thereof. Compounds of Formula VII are lower aliphatic and cycloaliphatic amines of up to 6 carbon atoms, particularly methylamine, ethylamine, cyclohexylamine, as well as aniline and the derivatives of aniline substituted in the aromatic nucleus by methyl, ethyl, phenyl, methoxy, hydroxy, methylmercapto, trifluoromethyl, fluorine, chlorine, bromine, or iodine; 1- and 2-naphthylamine, 2- and 3-aminothiophen, 2-, 3-, and 4-aminopyridine, 2-aminothiazole, and 2-amino-4-methyl thiazole.

Furthermore, the compounds of Formula I can be obtained by reacting, with the aid of the Bischoff piperazine synthesis, 4-(ω(2-aminoethyl-amino) - alkyl)-pyrazoles of Formula VIII substituted at the N' atom, with ethylene dihalogenides of Formula IX, preferably ethylene chloride or ethylene bromide or analogous compounds, advantageously in the presence of acid-neutralizing agents. Compounds VIII are obtainable by reacting aldehydes of Formula XII with a substituted ethylenediamine derivative of the formula R⁴—NHCH₂CH₂NH₂ to form a Schiff base, and catalytically hydrogenating the latter. Compounds of Formula VIII are, for example, 4-(2-anilinoethylamino)-methyl-, 4-[2-(2-anilinoethylamino)-ethyl]-, 4-[3-(2-anilinoethylamino) - propyl]-, 4-[4-(2-anilinoethylamino)-butyl]-, 4-[5-(2 - anilinoethylamino)-pentyl]-, and 4-[6-(2-aminoethylamino) - hexyl] - pyrazole, as well as the derivatives thereof substituted in the aromatic nucleus as above, as well as the 1-methyl-, 1-benzyl-, and 1-phenyl-derivatives of these compounds.

The novel reactants or intermediates of this invention are:

3,5-dimethyl-4-(2-chloroethyl)-pyrazole
1-methyl-4-(2-chloroethyl)-pyrazole
1-ethyl-4-(3-chloropropyl)-pyrazole
1-n-propyl-4-(3-chloropropyl)-pyrazole
1-n-butyl-4-(3-chloropropyl)-pyrazole
1-phenyl-4-(3-chloropropyl)-pyrazole
3,5-dimethyl-4-(3-chloropropyl)-pyrazole
1-benzyl-4-(4-chlorobutyl)-pyrazole
4-(5-chloropentyl)-pyrazole
4-(6-chlorohexyl)-pyrazole
4-(7-chloroheptyl)-pyrazole
1-benzyl-4-(7-chloroheptyl)-pyrazole
4-(8-chlorooctyl)-pyrazole
1-benzyl-4-(8-chlorooctyl)-pyrazole
4-(9-chlorononyl)-pyrazole
1-benzyl-4-(9-chlorononyl)-pyrazole
4-(10-chlorodecyl)-pyrazole
1-benzyl-4-(10-chlorodecyl)-pyrazole The reactions of compounds IV with V, or VI with VII, or VIII with IX are conducted normally under the above-described conditions for the reaction of compounds II with III. In the synthesis according to Bischoff, generally somewhat more vigorous conditions are observed; for example, the reaction mixture is heated to temperatures between 120 and 160° C., if desired, in the presence of a higher-boiling inert solvent and a strong base, such as sodium hydroxide or sodium carbonate, while stirring for 6–8 hours.

Starting with an N-substituted morpholine, it is advantageous to heat the hydrochloride thereof, together with that of the 4-(ω-aminoalkyl)-pyrazole, for a period of time at 230–240° C., the water formed during the reaction being removed by distillation.

It is furthermore possible to react a 2-(ω-piperazinoalkyl)-1,3-dicarbonyl compound of Formula X with a hydrazine of Formula XI, which can, if desired, be substituted. The process is conducted in accordance with the methods known from the literature for the formation of pyrazoles from β-carbonyl compounds and hydrazines. Normally, the hydrazine XI is produced in situ by mixing an aqueous or alcoholic solution of a sulfate or hydrochloride with equivalent amounts of sodium hydroxide or potassium hydroxide. Compound X is added dropwise to this solution, if desired, in an inert organic solvent, such as methanol, ethanol, tetrahydrofuran, or dioxane, and/or under cooling, and the reaction is terminated by allowing the mixture to stand, stirring the same, and/or heating the same. Normally, the reaction is conducted at temperatures between 0° C. and the boiling point of the solvent employed in the reaction, and the reaction time can last from a few minutes up to 10 hours.

The starting compounds of Formula X are obtained by reacting 1-piperazino-ω-haloalkanes, for example 1-(N'-phenylpiperazino)-2-bromoethane, with the alkali enolates of 1,3-dicarbonyl compounds, for example the sodium compound of acetyl acetone. Starting compounds of Formula X are particularly the following: 3-[2-(N'-phenylpiperazine) - ethyl] - pentanedione-(2,4) and other 3-[ω-piperazinoalkyl] - pentanediones - (2,4) - hexanediones-(2,4), and 4 - [ω - piperazinoalkyl]-heptanediones-(3,5) substituted in the N'-position by a residue R⁴. Hydrazines of Formula XI which are mainly employed are hydrazine, methyl-, ethyl-, phenyl-, or benzyl-hydrazine.

It is further possible to obtain a compound of Formula I by starting with a preliminary product having the same basic structure but containing additionally one or several groups substitutable by hydrogen, and/or C=C double bonds, and/or C≡C triple bonds, and treating this preliminary product with agents giving off hydrogen, such as those mentioned below.

For example, chlorine or bromine atoms present on the aromatic or the pyrazole nucleus or on the alkyl chain can be replaced with hydrogen by catalytic hydrogenation or treatment with chemical reducing agents. Thus, it is possible to convert 3,5-dihalopyrazoles by treatment with zinc and hydrochloric acid, or with phosphorus and hydrogen iodide into the halogen-free pyrazole derivatives. Likewise, in this manner, it is possible to reduce 3,5-dibromo-4-[2-(N' - phenylpiperazine) - ethyl] - pyrazole (obtainable by reacting 1-(N'-phenyl-piperazine)-2-bromoethane with the sodium compound of the malonic acid diethyl ester, reaction of the thus-obtained 2-(N'-phenyl-piperazine)-ethyl-malonic ester with hydrazine to form the pyrazolinedione-derivative, and reaction with phosphorus oxybromide) to form 4-[2-(N'-phenyl-piperazine)-ethyl]-pyrazole. Analogously, 3,5 - dibromo - 4 - [3 - (N'-phenyl-piperazine)-propyl]-pyrazole is reducible.

It is furthermore possible, for example, to react β-pyrazolyl-propionic aldehyde (or 4-formylpyrazole) with malonic acid in pyridine/piperidine to form 5-pyrazolyl-(4)-pentene-2-acid (or to form pyrazolyl-4-acrylic acid) which, if desired, can be hydrogenated to form 5-(pyrazolyl-(4)-pentanoic acid) (or β-pyrazolyl-4-propionic acid). The acid chlorides of these acids can be converted, with 1-substituted piperazines of Formula III, into the corresponding acid amides, and the latter can be converted, for example, with lithium aluminum hydride, into the compounds of Formula I. In the case of the pentanoic acid derivative (or the acrylic acid derivative), an additional catalytic hydrogenation must be performed.

Keto or hydroxy groups in the α-position with respect to the pyrazole nucleus can be eliminated reductively, for example, by catalytic hydrogenation, and keto groups can additionally be removed by a Clemmensen reduction. Corresponding starting compounds can be produced with the aid of the Mannich condensation process. Thus, for example, the 1,3,5 - trimethyl - 4 - [1-oxo-2-methyl-3-(N'-phenyl-piperazino)-propyl]-pyrazole is obtainable from 1,3,5-trimethyl-4-propionylpyrazole, formaldehyde, and N-phenylpiperazine. The reaction of 1,3,5-trimethyl-4- [1 - oxo - 2 - methyl - 3-(N'-phenyl-piperazino)-propyl]-pyrazole with methyl magnesium iodide leads to 1,3,5-trimethyl-4-[1 - (1'-phenyl-piperazino) - 3 - hydroxybutyl-3]-pyrazole.

In the production of substances of Formula I wherein $R^1$ is H, intermediate products are sometimes advantageously employed which possess protective groups in the 1-position of the pyrazole ring which are removable by reduction. For example, by reaction of 1-benzyl-4-(2-aminoethyl)-pyrazole with N,N-bis-(2-chloroethyl)-aniline, there is obtained the 1-benzyl-4-[2-(N'-phenyl-piperazino)-ethyl]-pyrazole yielding, with catalytically activated hydrogen, 4-[2-(N'-phenyl-piperazino)-ethyl]-pyrazole. Cleavage of the benzyl group can also be achieved by dissolving the benzyl compound in liquid ammonia, or suspending the same in liquid ammonia, and adding a small excess of sodium.

For catalytic hydrogenations and/or hydrogenolyses, suitable catalysts are, for example, noble metal, nickel, and cobalt catalysts, as well as copper-chromium-oxide. The noble metal catalysts can be provided on supports, such as for example palladium on charcoal, calcium carbonate or strontium carbonate. Also suitable forms of the noble metal catalyst are oxide catalysts, such as for example platinum oxide; as well as finely divided metal catalysts. Nickel and cobalt catalysts are suitably employed as Raney metals, and nickel also on kieselguhr or pumice as the support. The hydrogenation can be conducted either at room temperature and normal pressure, or also at elevated temperatures and/or elevated pressures. Preferably, pressures are employed between 1 and 100 atmospheres, and temperatures ranging between —80° and 150° C. are used. Suitably, the reaction is conducted in the presence of a solvent, such as water, methanol, ethanol, isopropanol, tert. butanol, ethyl acetate, dioxane, acetic acid, or tetrahydrofuran. For the hydrogenation, the free bases or the corresponding salts, for example, the hydrochlorides, can be employed. The conditions of the hydrogenation reaction must be selected in such a manner that the other reducible groups or systems present in the molecule, for example the pyrazole ring, as well as any aromatic or heterocyclic rings which are present, are not likewise attacked. In the hydrogenation of C=C double bonds and in the hydrogenolysis of benzyl groups, the reaction is therefore preferably conducted at normal pressure in such a manner that the hydrogenation is stopped after absorption of the stoichiometric quantity of hydrogen.

Reductions with chemical agents, such as exemplified above, are conducted in accordance with the conventional, known methods described in the literature.

Thus, it is possible to use as a reducing agent lithium aluminum hydride in ether, tetrahydrofuran, or di-n-butyl-ether, the solvent being preferably at the boiling temperature. In this connection, it is sometimes advantageous to extract continuously the starting materials having a low solubility, in accordance with the Soxhlet method, together with the boiling solvent.

Bromine atoms on the pyrazole nucleus are suitably replaced with hydrogen by dissolving the pyrazole in concentrated hydrochloric acid, adding a large excess of zinc, and heating the same for several hours to about 100° C. Chlorine atoms can be split off reductively, for example, by mixing the pyrazole compound with the same quantity of phosphorus, addition of about 4 parts by volume of 20% hydriodic acid, and heating for about 10 hours in the tube to approximately 170-180° C. In all these processes, care must, of course, be taken that other groups which may be present do not simultaneously react with the employed reactant in an undesirable manner; for example, alkoxy groups can be split off in the presence of hydrogen iodide.

The products of Formula I obtained in accordance with one of the above-described methods are isolated from the reaction mixtures in a conventional manner, for example by extraction, and they are then purified by distillation or crystallization of the bases or the salts—predominantly the hydrochloride salts thereof. Also chromatographical methods can be employed to isolate and purify these compounds.

The compounds of Formula I can be converted into the acid addition salts thereof with an acid in the conventional manner. In these reactions, such acids can be employed which yield physiologically compatible salts. Thus, it is possible to use organic and inorganic acids, such as, for example, aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric caid, malic acid, aminocarboxylic acids, sulfaminic acid, benzoic acid, salicylic acid, phenylpropionic acid, citric acid, gluconic acid, ascorbic acid, nicotinic acid, isonicotinic acid, methanesulfonic acid, ethanedisulfonic acid, β-hydroxyethanesulfonic acid, p-toluenesulfonic acid, naphthalene-mono- and di-sulfonic acids, sulfuric acid, nitric acid, hydrohalic acids, such as hydrochloric acid or hydrobromic acid, or phosphoric acids, such as orthophosphoric acid.

The free bases of Formula I can be obtained, if desired, from the salts thereof, by treating with strong bases, such as sodium or potassium hydroxide or carbonate.

Preferably, compounds of the following formulae can be produced according to the invention:

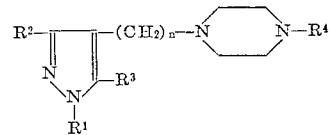

wherein $n$ represents 1 to 10; and

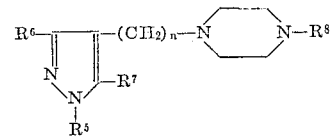

wherein $R^5$ is H, methyl, ethyl, benzyl, or phenyl,
$R^6$ is H or methyl,
$R^7$ is H or methyl,
$R^8$ is methyl, ethyl, cyclohexyl, benzyl, 1- or 2-naphthyl, 2- or 3-thienyl, 2-, 3-, or 4-pyridyl, 4-methyl-2-thiazolyl, phenyl, or phenyl substituted at the orthometa- or (preferably) para-positions with a member selected from the group consisting of a methyl, ethyl, phenyl, methoxy, methylenedioxy, hydroxy, methylmercapto, trifluoromethyl group, fluorine, chlorine, bromine and iodine.

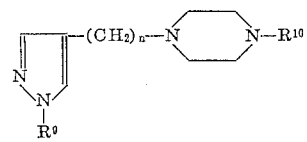

wherein $R^9$ represents H, methyl or phenyl,
$R^{10}$ is methyl, benzyl, phenyl, p-tolyl, p-methoxyphenyl, o-, m-, or p-chlorophenyl, p-methylmercaptophenyl, m-trifluoromethylphenyl, 2- or 3-thienyl, 2-pyridyl, or 4-methyl-2-thiazolyl.

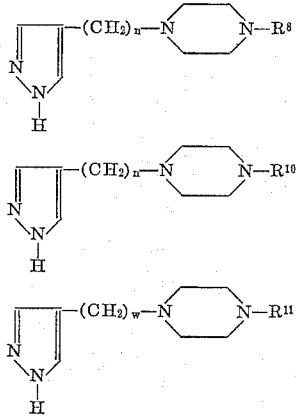

wherein

R$^{11}$ represents phenyl, o-chlorophenyl, or p-chlorophenyl, and w is 1 to 4, as well as the acid addition salts of Formulae XIII, XIV, XV, XVI, XVII, and XVIII.

The novel compounds can be employed in admixture with conventional excipients in either human or veterinary medicine. Carrier substances are such organic or inorganic compounds which are suitable for parenteral or enteral application and which do not react with the novel compounds, such as, for example, water, vegetable oils, polyethylene glycols, gelatin, lactic sugar, amylose, magnesium stearate, talc, vaseline, cholesterol, etc. For parenteral application, particularly suitable are solutions, preferably oily or aqueous solutions, as well as suspensions, emulsions, or implants. For enteral application, there can furthermore be used syrups, tablets or dragees which are, if desired, sterilized, or mixed with auxiliary agents, such as preservatives, stabilizers, or wetting agents, or salts for influencing the osmotic pressure, or buffer substances.

The substances can also be used as topical agents in an ointment vehicle or the like.

Tablets comprising the substances of the invention will contain at least one member of the carbohydrate group, preferably lactose and/or corn starch and/or potato starch.

Syrups are made with the addition of a sweetened vehicle.

The substances of the invention are preferably applied to animals and mammals at dosage levels of 2 to 100 mg. per unit dosage, in some cases at dosage levels up to 500 mg. per unit dosage. With respect to the body weight, preferred dosage ranges are 0.01 to 0.2 mg./kg. for intravenous, 0.02 to 0.4 mg./kg. for intramuscular and 0.05 to 5 mg./kg. for oral applications. The concentration of solutions for locally anesthetic purposes is 0.01 to 5 percent by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

6.5 g. 4-(2-chloroethyl)-pyrazole and 16.2 g. N-phenylpiperazine are mixed and heated for 2 hours to 120–130° C. After cooling, the mixture is triturated with aqueous ammonia and extracted with benzene. The extraction residue is converted into the hydrochloride. There are obtained 12 g. 4-[2-(N'-phenylpiperazino)-ethyl]-pyrazole-trihydrochloride, M.P. 253–254° C.

By a similar process, the following compounds are produced—

From 4-(2-chloroethyl)-pyrazole:

4 - [2 - (N' - pyridyl - (2) - piperazino) - ethyl] - pyrazole, trihydrochloride, M.P. 272–274° C.;

4 - [2 - (N' - o - chlorophenyl - piperazino) - ethyl] - pyrazole, dihydrochloride - monohydrate, M.P. 238–239° C.;

4 - [2 - (N' - cyclohexyl - piperazino) - ethyl] - pyrazole, dihydrochloride, M.P. 320–323° C. (decomposition).

From 3,5-dimethyl-4-(2-chloroethyl)-pyrazole:

3,5 - dimethyl - 4 - [2 - (N' - phenylpiperazino) - ethyl]-pyrazole, dihydrochloride, M.P. 290–293° C.;

3,5 - dimethyl - 4 - [2 - (N' - o - chlorophenylpiperazino)-ethyl]-pyrazole, dihydrochloride, M.P. 280–283° C. (decomposition);

3,5 - dimethyl - 4 - [2 - (N' - p - chlorophenylpiperazino)-ethyl]-pyrazole, dihydrochloride, M.P. 252–254° C.

From 1-methyl-4-(2-chloroethyl-pyrazole:

1 - methyl - 4 - [2 - (N' - o - chlorophenylpiperazino)-ethyl]-pyrazole, dihydrochloride, M.P. 223–225° C. (decomposition);

1 - methyl - 4 - [2 - (N' - 2 - pyridyl - piperazino) - ethyl]-pyrazole, trihydrochloride, M.P. 229–231° C. (decomposition).

From 4-(3-chloropropyl)-pyrazole or 4-(3-bromopropyl)-pyrazole:

4 - [3 - (N' - phenyl - piperazino) - propyl] - pyrazole, trihydrochloride, M.P. 257–259° C.;

4 - [3 - (N' - methyl - piperazino) - propyl] - pyrazole, B.P. 146–149/0.01 mm.; trihydrochloride, M.P. 266–269° C.;

4 - [3 - (N' - cyclohexyl - piperazino) - propyl] - pyrazole, trihydrochloride, M.P. 296–298° C. (decomposition);

4 - [3 - (N' - benzyl - piperazino) - propyl] - pyrazole, trihydrochloride, M.P. 268–270° C.;

4 - [3 - (N' - p - tolyl - piperazino) - propyl] - pyrazole, trihydrochloride, M.P. 262–264° C.;

4 - [3 - (N' - m - trifluoromethylphenyl - piperazino - propyl]-pyrazole, trihydrochloride, M.P. 246–247° C.;

4 - [3 - (N' - o - chlorophenyl-piperazino) - propyl] - pyrazole, M.P. 150–152° C. (from ether); dihydrochloride, M.P. 252–254° C.;

4 - [3 - (N' - m - chlorophenyl - piperazino) - propyl]-pyrazole, trihydrochloride, M.P. 216–218° C.;

4 - [3 - (N' - p - chlorophenyl - piperazino) - propyl] - pyrazole, trihydrochloride, M.P. 245–247° C.;

4 - [3 - (N' - 2 -pyridyl - piperazino) - propyl] - pyrazole, trihydrochloride-monohydrate, double M.P. 205° C. (concomitant loss of the crystal water) and 248–250° C.;

4 - [3 - (N' - (4 - methylthiazolyl - 2) - piperazino) - propyl]-pyrazole, trihydrochloride, M.P. 238–240° C.

From 1-methyl-4-(3-chloropropyl)- or -(3-bromopropyl)-pyrazole:

1 - methyl - 4 - [3 - (N' - methyl - piperazino) - propyl]-pyrazole, B.P. 165–168° C./7 mm.; trihydrochloride, M.P. 255–257° C.;

1 - methyl - 4 - [3 - (N' - benzyl - piperazino) - propyl]-pyrazole, B.P. 190–193°/0.01 mm.; trihydrochloride, M.P. 254–257° C.;

1 - methyl - 4 - [3 - (N' - phenyl - piperazino) - propyl]-pyrazole, B.P. 168–170°/0.01 mm.; trihydrochloride; M.P. 217–219° C.;

1 - methyl - 4 - [3 - (N' - p - tolyl - piperazino) - propyl]-pyrazole, trihydrochloride, M.P. 221–223° C.;

1 - methyl - 4 - [3 - (N' - o - chlorophenyl - piperazino)-propyl]-pyrazole, dihydrochloride, M.P. 182–184° C.;

1 - methyl - 4 - [3 - (N'-m-chlorophenyl-piperazino)-propyl]-pyrazole, trihydrochloride, M.P. 172–174° C.;

1 - methyl - 4 - [3 - (N' - p - chlorophenyl - piperazino)-propyl]-pyrazole, trihydrochloride, M.P. 206–209° C.;

1 - methyl - 4 - [3 - (N' - p - methoxyphenyl - piperazino) - propyl]-pyrazole, trihydrochloride, M.P. 201–203° C.;

1 - methyl - 4 - [3 - (N' - pyridyl - piperazino) - propyl]-pyrazole, trihydrochloride, M.P. 230–232° C.

From 1-ethyl-4-(3-chloropropyl)-pyrazole:

1 - ethyl - 4 - [3 - (N' - phenyl - piperazino) - propyl]-pyrazole, trihydrochloride-hydrate, M.P. 218–220° C.

From 1-n-propyl-4-(3-chloropropyl)-pyrazole:

1 - n - propyl - 4 - [3 - (N' - phenyl - piperazino) - propyl]-pyrazole, trihydrochloride, M.P. 207–209° C.

From 1-n-butyl-4-(3-chloropropyl)-pyrazole:

1 - n - butyl - 4 - [3 - (N' - phenyl - piperazino) - propyl]-pyrazole trihydrochloride, M.P. 202–204° C.

From 1-phenyl-4-(3-chloropropyl)-pyrazole:

1 - phenyl - 4 - [3 - (N' - methyl - piperazino) - propyl]-pyrazole, B.P. 162–164°/0.03 mm.; trihydrochloride M.P. 224–226° C.;

1 - phenyl - 4 - [3 - (N' - benzyl - piperazino) - propyl]-pyrazole; trihydrochloride, M.P. 260–262° C.

From 3,5-dimethyl-4-(3-chloropropyl)-pyrazole (produced by reacting the sodium compound of the acetyl acetone with β-chloropropionic acid ethyl ester, and subsequent reactions with hydrazine, lithium aluminum hydride, and thionyl chloride) there are obtained the compounds:

3,5 - dimethyl - 4 - [3 - (N' - o - chlorophenyl - piperazino)-propyl]-pyrazole, trihydrochloride, M.P. 298–300° C.;

3,5 - dimethyl - 4 - [3 - (N' - p - chlorophenyl - piperazino)-propyl]-pyrazole, trihydrochloride, M.P. 254–257° C.

From 1-benzyl-4-(4-chlorobutyl)-pyrazole (B.P. 155–157° C./0.05 mm., obtainable by reaction of 1-benzyl-4-(3-chloropropyl)-pyrazole with potassium cyanide to form 1-benzyl-4-(3-cyanopropyl)-pyrazole (B.P. 178–180° C./0.03 mm.), reaction with ethanol/sulfuric acid to form 4-[1-(benzyl-pyrazolyl-4)-butyric acid]ethyl ester (B.P. 146–148° C./0.05 mm.), reduction with lithium aluminum hydride to form 1-benzyl-4-(4-hydroxybutyl)-pyrazole (B.P. 166–168° C./0.15 mm.) and reaction with thionyl chloride) there is produced:

1 - benzyl - 4 - [4 - (N' - phenyl - piperazino) - butyl]-pyrazole, trihydrochloride hydrate, M.P. 186–189° C.

By the analogous process 4-(5-chloropentyl)-pyrazole (obtainable by reaction of 1-benzyl-4-(3-chloropropyl)-pyrazole with malonic acid diethyl ester, subsequent saponification, decarboxylation, and re-esterification to form 5-(1-benzyl-pyrazolyl-4)-pentanoic acid ethyl ester (B.P. 166–168° C./0.2 mm.) reduction with lithium aluminum hydride to 1-benzyl-4-(5-hydroxy-pentyl)-pyrazole (B.P. 180–182° C./0.05 mm.), splitting off the benzyl group with sodium in liquid ammonia to form 4-(4-hydroxypentyl)-pyrazole (B.P. 163–165° C./0.4 mm.) and treatment with thionyl chloride) yields:

4 - [5 - (N' - phenylpiperazino) - pentyl] - pyrazole, M.P. 108–109° C.; trihydrochloride, M.P. 239–241° C.;

4 - [5 - (N' - o - chlorophenyl - piperazino) - pentyl]-pyrazole, trihydrochloride, M.P. 183–185° C.; and 4 - [5 - (N' - 2 - pyridyl - piperazino) - pentyl] - pyrazole, trihydrochloride hydrate, M.P. 206–209° C.; and from 1-benzyl-4-(7-chloroheptyl)-pyrazole (B.P. 150–152° C./0.02 mm., obtainable from 1-benzyl-4-(5-chloropentyl)-pyrazole by reaction with malonic acid diethyl ester, subsequent saponification, decarboxylation, and re-esterification to form 7-(1-benzyl-pyrazolyl-4)-heptanoic acid ethyl ester (B.P. 170–172° C./0.05 mm.), reduction with lithium aluminum hydride to form 1-benzyl-4-(7-hydroxyheptyl)-pyrazole (B.P. 180–182° C./0.05 mm.) and treatment with thionyl chloride); the following are produced:

1 - benzyl - 4 - [7 - (N' - phenyl - piperazino) - heptyl]-pyrazole.

From 1-benzyl-4-(9-chlorononyl)-pyrazole (B.P. 163–166° C./0.03 mm.), obtainable from 1-benzyl-4-(7-chloroheptyl)-pyrazole via 9-(1-benzyl-pyrazolyl-4)-nonanoic acid ethyl ester (B.P. 170–173° C./0.05 mm.) and 1-benzyl-4 - (9 - hydroxynonyl) - pyrazole (B.P. 190–192° C./0.05 mm.):

1 - benzyl - 4 - [9 - (N' - phenyl - piperazino) - nonyl]-pyrazole.

EXAMPLE 2

14.4 g. 4-(3-chloropropyl)-pyrazole and 16.2 g. N-phenylpiperazine are stirred in 200 ml. butanol in the presence of 15.2 g. anhydrous potassium carbonate for 20 hours at 100–110° C. After cooling, the reaction mixture is filtered off from the precipitated salts, and the filtrate is evaporated under vacuum. The residue is treated in a small quantity of butanol with ethereal hydrochloric acid; after a short heating period, the reaction mixture is filtered off from the separated resins and cooled. There are obtained 10 g. 4-[3-(N'-phenylpiperazino)-propyl]-pyrazole-trihydrochloride, M.P. 257–259° C. (from ethanol).

EXAMPLE 3

7.2 g. 4-(3-chloropropyl)-pyrazole and 16.2 g. N-phenylpiperazine are boiled for 12 hours in 75 ml. toluene. After cooling, the crystallized N-phenylpiperazino-hydrochloride is vacuum-filtered; the filtrate is concentrated and the residue is purified via the hydrochloride. There are obtained 9 g. 4-[3-(N'-phenylpiperazino)-propyl]-pyrazole-trihydrochloride, M.P. 257–259° C. (from ethanol).

In an analogous manner, there are obtainable:

4-[3-(N'-p-methoxyphenylpiperazino)-propyl] - pyrazole, trihydrochloride, M.P. 247–249° C.;

1-methyl-4-[3-(N'-p-methoxyphenylpiperazino) - propyl]-pyrazole (20 hours boiling), trihydrochloride, M.P. 201–203° C.;

1-phenyl-4-[3-(N'-phenylpiperazino) - propyl] - pyrazole, M.P. 108–111° C.; trihydrochloride, M.P. 207–209° C.

EXAMPLE 4

10 g. [3-(1-methylpyrazolyl-4)-propyl]-bis-(2-chloroethyl)-amine (B.P. 160–163° C./0.2 mm.) and 10.6 g. aniline are boiled for 24 hours in a mixture of 300 ml. acetone and 300 ml. water. Subsequently, the reaction mixture is concentrated, made alkaline with sodium hydroxide, and extracted with benzene. From the benzene extract, there is obtained, after drying and removal of the solvent, 1-methyl-4-[3-(N'-phenylpiperazino) - propyl]-pyrazole, B.P. 168–170° C./0.01 mm.

EXAMPLE 5

20.9 g. 1 - methyl-4-(3 - morpholinopropyl) - pyrazole (B.P. 109–112° C./0.01 mm.) and 10 g. aniline are dissolved in 20 ml. concentrated hydrochloric acid. The solution is evaporated to dryness under vacuum, and the residue is subsequently heated for 4 hours to 230–240° C., the produced water being distilled off. After cooling, the reaction solution is mixed with sodium hydroxide and extracted with benzene. After the solvent has been removed, there is obtained 1-methyl-4-[3-(N'-phenylpiperazino)-propyl]-pyrazole, B.P. 168–170° C./0.01 mm.

EXAMPLE 6

A solution of 6 g. 3-[3-(N'-phenylpiperazino)-propyl]-pentane-dione-(2,4), obtained by reaction of 1-phenyl-4-(3 - chloropropyl) - piperazine (B.P. 138–140° C./0.05 mm.) with sodium compound of the acetyl acetone, in 40 ml. ethanol is added dropwise and under stirring to a solution of 10 g. hydrazine hydrate in 60 ml. ethanol.

Subsequently, the reaction mixture is boiled for one hour, and then concentrated. Solutions of sodium hydroxide and benzene are added, and the crude base obtained from the benzene layer is purified via the hydrochloride. There is obtained 3,5 - dimethyl-4-[3 - (N' - phenylpiperazino)-propyl]-pyrazole-trihydrochloride, M.P. 272–274° C.

In an analogous manner there is obtained, from undecanedione - (5,7) and p - ethoxyphenylhydrazine, 1 - p-ethoxyphenyl-3,5-di-n-butyl-4-[3-(N' - phenylpiperazino)-propyl]-pyrazole.

EXAMPLE 7

3 g. 4-[3-(N'-p-chlorophenylpiperazino)-propyl]-pyrazole are hydrogenated in the presence of 0.5 g. 5% palladium charcoal catalyst in 40 ml. methanol at normal pressure and a temperature at 55° C. until the reaction is completed. The mixture is allowed to cool, vacuum-filtered from the catalyst, concentrated, and the residue is mixed with ethereal hydrochloric acid. After recrystallization from ethanol, there are obtained 2.9 g. 4-[3-(N'-phenylpiperazino) - propyl] - pyrazole - trihydrochloride, M.P. 257–259° C.

EXAMPLE 8

(a) 18.8 g. 1-benzyl-4-hydroxymethyl-pyrazole are dissolved in 50 ml. chloroform and mixed batchwise with 15 ml. thionyl chloride. The mixture is boiled for 10 minutes and then concentrated. The residue is mixed with 37 g. N-phenylpiperazine and heated for 1 hour to 120–130° C. After cooling, the mixture is triturated with aqueous ammonia and extracted with benzene. The extraction residue is freed from excess N-phenylpiperazine. The remaining base is purified via the hydrochloride (M.P. 230–233° C.). There are obtained 10.5 g. 1-benzyl-4 - (N'-phenylpiperazino) - methyl - pyrazole, M.P. 75–76° C.

(b) To a fine suspension of 7.1 g. 1-benzyl-4-(N'-phenylpiperazino)-methyl-pyrazole in 65 ml. liquid ammonia, there is added, in small portions, 1 g. sodium. 3 g. ammonium chloride are added, and the ammonia is allowed to evaporate. The residue is mixed with some water and extracted with chloroform. The chloroform residue is recrystallized from ether. There are obtained 4.3 g. 4-(N'-phenylpiperazino) - methyl - pyrazole, M.P. 172–175° C. The dihydrochloride melts at 217–220° C.

In an analogous process, there are obtained from the corresponding 1-benzyl-pyrazoles:

4-[4-(N'-phenylpiperazino)-butyl]-pyrazole, M.P. 132–133° C.; trihydrochloride, M.P. 258–260° C. (decomposition);
4-[7-(N'-phenylpiperazino)-heptyl] - pyrazole, trihydrochloride, M.P. 228–230° C.;
4-[9-(N'-phenylpiperazino) - nonyl] - pyrazole, trihydrochloride, M.P. 207–210° C.

EXAMPLE 9

22 g. crude 1-benzyl-pyrazolyl-4-carboxylic acid chloride are added dropwise while stirring and cooling in 100 ml. absolute ether to a solution of 16.2 g. N-phenylpiperazine and 11 g. triethylamine in 500 ml. absolute ether. After the reaction is completed, the mixture is shaken with water, and the organic phase, after being mixed with benzene, is separated, dried, and concentrated. The acid amide is dried, dissolved in 200 ml. absolute tetrahydrofuran, and the solution is added dropwise while stirring and introduction of absolute nitrogen to a suspension of 5 g. lithium aluminum hydride in 250 ml. absolute ether. The reaction mixture is boiled for 20 hours. After the customary working-up operation and chromatographical purification, there is obtained the 1-benzyl-4-(N'-phenyl-piperazino)-methyl-pyrazole, M.P. 75–76° C.

EXAMPLE 10

From 11.9 g. N-phenyl-N'-(3-chloropropyl)-piperazine and 1.3 g. magnesium, in 100 ml. absolute ether, a Grignard compound is produced. To this reaction solution, there is added dropwise a solution of 9.3 g. 1-benzyl-4-formyl-pyrazole in 100 ml. absolute ether. After stirring for one hour, the reaction solution is decomposed by the addition of ice and dilute hydrochloric acid, made alkaline with aqueous ammonia, and the ethereal solution is separated, dried, and concentrated. The crude residue, consisting of (1-benzyl-pyrazolyl-4) - [3 - (N'-phenylpiperazino)-propyl]-carbinol, in addition to a small quantity of 1 - (1 - benzyl-pyrazolyl-4) - 4 - (N' - phenylpiperazino)-butene, is hydrogenated in ethanol in the presence of 5% palladium charcoal catalyst under normal pressure. The working-up operation is conducted in the usual manner, and there is obtained 1-benzyl-4-[4-(N'-phenylpiperazino)-butyl] - pyrazole; trihydrochloride - hydrate, M.P. 186–189° C.

EXAMPLE 11

18.6 g. 1-benzyl-4-formyl-pyrazole and 13.6 g. N-phenyl-ethylenediamine in benzene are boiled in a reactor connected to a water trap until water ceases. After the benzene has been evaporated from the resulting 1-benzyl-4-(2-anilinoethyliminomethyl)-pyrazole, the latter is hydrogenated in ethanol in the presence of platinum oxide under normal pressure, to form 1-benzyl-4-(2-anilinoethylaminomethyl)-pyrazole. This substance is stirred for 10 hours in 500 ml. boiling xylene in the presence of 2.1 g. ethylene bromide and 25 g. anhydrous, powdered sodium carbonate. After a chromatographical working-up operation of the reaction product, there is obtained 1-benzyl-4-(N'-phenylpiperazino)-methyl-pyrazole, M.P. 75–76° C.

EXAMPLE 12

21.8 g. phenyl-bis-(2-chloroethyl)-amine and 42 g. 1-methyl-4-(3-aminopropyl)-pyrazole (obtained by reaction of 1-methyl-4-(3-chloropropyl)-pyrazole with phthalimide potassium and hydrolysis) are boiled in a mixture of 800 ml. acetone and 800 ml. water for 24 hours. Subsequently, the acetone is separated under vacuum, the aqueous mixture is made alkaline with sodium hydroxide solution and extracted with benzene. The residue of the benzene phase is distilled. After a multiple fractioning operation there is obtained 1-methyl-4-[3-(N'-phenylpiperazino)-propyl]-pyrazole, B.P. 168–170° C./0.01 mm.

EXAMPLE 13

Analogously to Example 1, there are obtained, from the corresponding 4-(ω-chloroalkyl)-, 4-(ω-bromoalkyl)-, 4-(ω-methanesulfonyloxyalkyl)-, or 4-ω-p-toluenesulfonyloxyalkyl)-pyrazoles, the following pyrazoles:

4-(N'-4-phenyl-butyl-piperazino)-methyl-pyrazole
4-(N'-o-chlorophenyl-piperazino)-methyl-
4-(N'-m-chlorophenyl-piperazino)-methyl-
4-(N'-p-chlorophenyl-piperazino)-methyl-
4-(N'-p-tolyl-piperazino)-methyl-
4-(N'-o-methoxyphenyl-piperazino)-methyl-
4-(N'-p-methoxyphenyl-piperazino)methyl-
4-(N'-m-trifluoromethylphenyl-piperazino)-methyl-
4-[N'-(pyridyl-2)-piperazino]-methyl-
4-[N'-(4-methylthiazolyl-2)-piperazino]-methyl-
4-[2-(N'-m-chlorophenyl-piperazino)-ethyl]-
4-[2-(N'-p-chlorophenyl-piperazino)-ethyl]-
4-[2-(N'-p-tolyl-piperazino)-ethyl]-
4-[2-(N'-o-methoxyphenyl-piperazino)-ethyl]-
4-[2-(N'-m-methoxyphenyl-piperazino)-ethyl]-
4-[2-(N'-p-methoxyphenyl-piperazino)-ethyl]-
4-[2-(N'-o-trifluoromethylphenyl-piperazino)-ethyl]-
4-[2-(N'-m-trifluoromethylphenyl-piperazino)-ethyl]-
4-[2-(N'-p-trifluoromethylphenyl-piperazino)-ethyl]-
4-[2-(N'-(pyridyl-3)-piperazino)-ethyl]-
4-[2-(N'-(pyridyl-4)-piperazino)-ethyl]-
4-[2-(N'-(thiazoyl-2)-piperazino)-ethyl]-
4-[2-(4-methylthiazolyl-2)-piperazino)-ethyl]-
4-[1-(N'-phenylpiperazino)-ethyl]-
4-[1-(N'-o-chlorophenyl-piperazino)-ethyl]-

4-[1-(N'-m-chlorophenyl-piperazino)-ethyl]-
4-[1-(N'-p-chlorophenyl-piperazino)-ethyl]-
4-[3-(N'-ethyl-piperazino)-propyl]-
4-[3-(N'-n-propyl-piperazino)-propyl]-
4-[3-(N'-isopropyl-piperazino)-propyl]-
4-[3-(N'-n-butyl-piperazino)-propyl]-
4-[3-(N'-isobutyl-piperazino)-propyl]-
4-[3-(N'-sec.-butyl-piperazino)-propyl]-
4-[3-(N'-tert.-butyl-piperazino)-propyl]-
4-[3-(N'-n-amyl-piperazino)-propyl]-
4-[3-(N'-isoamyl-piperazino)-propyl]-
4-[3-(N'-tert.-amyl-piperazino)-propyl]-
4-[3-(N'-n-hexyl-piperazino)-propyl]-
4-[3-(N'-(3-methylpentyl-3)-piperazino)-propyl]-
4-[3-(N'-(2-methylpentyl-2)-piperazino)-propyl]-
4-[3-(N'-cyclopentyl-piperazino)-propyl]-
4-[3-(N'-cycloheptyl-piperazino)-propyl]-
4-[3-(N'-cyclohexen-2-yl-piperazino)-propyl]-
4-[3-(N'-o-tolyl-piperazino)-propyl]-
4-[3-(N'-m-tolyl-piperazino)-propyl]-
4-[3-(N'-p-ethylphenyl-piperazino)-propyl]-
4-[3-(N'-phenylphenyl-piperazino)-propyl]-
4-[3-(N'-o-methoxyphenyl-piperazino)-propyl]-
4-[3-(N'-m-methoxyphenyl-piperazino)-propyl]-
4-[3-(N'-3,4-methylenedioxyphenyl-piperazino)-propyl]-
4-[3-(N'-o-hydroxyphenyl-piperazino)-propyl]-
4-[3-(N'-m-hydroxyphenyl-piperazino)-propyl]-
4-[3-(N'-p-hydroxyphenyl-piperazino)-propyl]-
4-[3-(N'-o-methylmercaptophenyl-piperazino)-propyl]-
4-[3-(N'-m-methylmercaptophenyl-piperazino)-propyl]-
4-[3-(N'-p-methylmercaptophenyl-piperazino)-propyl]-
4-[3-(N'-o-trifluoromethylphenyl-piperazino)-propyl]-
4-[3-(N'-p-trifluoromethylphenyl-piperazino)-propyl]-
4-[3-(N'-o-fluorophenyl-piperazino)-propyl]-
4-[3-(N'-m-fluorophenyl-piperazino)-propyl]-
4-[3-(N'-p-fluorophenyl-piperazino)-propyl]-
4-[3-(N'-o-bromophenyl-piperazino)-propyl]-
4-[3-(N'-m-bromophenyl-piperazino)-propyl]-
4-[3-(N'-p-bromophenyl-piperazino)-propyl]-
4-[3-(N'-o-iodophenyl-piperazino)-propyl]-
4-[3-(N'-m-iodophenyl-piperazino)-propyl]-
4-[3-(N'-p-iodophenyl-piperazino)-propyl]-
4-[3-(N'-1-naphthyl-piperazino)-propyl]-
4-[3-(N'-2-naphthyl-piperazino)-propyl]-
4-[3-(N'-2-thienyl-piperazino)-propyl]-
4-[3-(N'-3-thienyl-piperazino)-propyl]-
4-[3-(N'-3-pyridyl-piperazino)-propyl]-
4-[3-(N'-4-pyridyl-piperazino)-propyl]-
4-[3-(N'-(6-methoxy-2-pyridyl)-piperazino)-propyl]-
4-[3-(N'-2-thiazolyl-piperazino)-propyl]-
4-[3-(N'-(1,3,5-trimethylpyrazolyl-4)-piperazino)-propyl]-
4-[3-(N'-(6-methoxy-8-quinolyl)-piperazino)-propyl]-
1-methyl-4-[3-(N'-ethyl-piperazino)-propyl]-
1-methyl-4-[3-(N'-2-thienyl-piperazino)-propyl]-
1-methyl-4-[3-(N'-3-thienyl-piperazino)-propyl]-
1-isopropyl-4-[3-(N'-phenyl-piperazino)-propyl]-
1-benzyl-4-[3-(N'-methyl-piperazino)-propyl]-
1-benzyl-4-[3-(N'-ethyl-piperazino)-propyl]-
1-benzyl-4-[3-(N'-benzyl-piperazino)-propyl]-
1-benzyl-4-[3-(N'-phenyl-piperazino)-propyl]-
1-benzyl-4-[3-(N'-o-chlorophenyl-piperazino)-propyl]-
1-benzyl-4-[3-(N'-p-chlorophenyl-piperazino)-propyl]-
1-(4-phenyl-butyl)-4-[3-(N'-phenyl-piperazino)-propyl]-
1-phenyl-4-[3-(N'-ethyl-piperazino)-propyl]-
1-phenyl-4-[3-(N'-o-chlorophenyl-piperazino)-propyl]-
1-phenyl-4-[3-(N'-p-chlorophenyl-piperazino)-propyl]-
3,5-dimethyl-4-[3-(N'-methyl-piperazino)-propyl]-
3,5-dimethyl-4-[3-(N'-ethyl-piperazino)-propyl]-
3,5-dimethyl-4-[3-(N'-benzyl-piperazino)-propyl]-
1,3,5-trimethyl-4-[3-(N'-phenyl-piperazino)-propyl]-
1-ethyl-3,5-dimethyl-4-[3-(N'-phenyl-piperazino)-propyl]-
1-phenyl-3,5-dimethyl-4-[3-(N'-phenyl-piperazino)-propyl]-
4-[1-(N'-phenyl-piperazino)-propyl-2]-
4-[1-(N'-o-chlorophenyl-piperazino)-propyl-2]-
4-[1-(N'-m-chlorophenyl-piperazino)-propyl-2]-
4-[1-(N'-p-chlorophenyl-piperazino)-propyl-2]-
4-[2-(N'-phenyl-piperazino)-propyl]-
4-[2-(N'-o-chlorophenyl-piperazino)-propyl]-
4-[2-(N'-m-chlorophenyl-piperazino)-propyl]-
4-[2-(N'-p-chlorophenyl-piperazino)-propyl]-
4-[4-(N'-o-chlorophenyl-piperazino)-butyl]-
4-[4-(N'-m-chlorophenyl-piperazino)-butyl]-
4-[4-(N'-p-chlorophenyl-piperazino)-butyl]-
4-[4-(N'-p-tolyl-piperazino)-butyl]-
4-[4-(N'-o-methoxyphenyl-piperazino)-butyl]-
4-[4-(N'-m-methoxyphenyl-piperazino)-butyl]-
4-[4-(N'-p-methoxyphenyl-piperazino)-butyl]-
4-[4-(N'-o-trifluoromethylphenyl-piperazino)-butyl]-
4-[4-(N'-m-trifluoromethylphenyl-piperazino)-butyl]-
4-[4-(N'-p-trifluoromethylphenyl-piperazino)-butyl]-
4-[4-(N'-(pyridyl-2)-piperazino)-butyl]-
4-[4-(N'-(pyridyl-3)-piperazino)-butyl]-
4-[4-(N'-(pyridyl-4)-piperazino)-butyl]-
4-[4-(N'-(thiazolyl-2)-piperazino)-butyl]-
4-[4-(N'-(4-methylthiazolyl-2)-piperazino)-butyl]-
4-[5-(N'-m-chlorophenyl-piperazino)-pentyl]-
4-[5-(N'-p-chlorophenyl-piperazino)-pentyl]-
4-[6-(N'-phenyl-piperazino)-hexyl]-
4-[6-(N'-o-chlorophenyl-piperazino)-hexyl]-
4-[6-(N'-m-chlorophenyl-piperazino)-hexyl]-
4-[6-(N'-p-chlorophenyl-piperazino)-hexyl]-
4-[7-(N'-o-chlorophenyl-piperazino)-heptyl]-
4-[7-(N'-m-chlorophenyl-piperazino)-heptyl]-
4-[7-(N'-p-chlorophenyl-piperazino)-heptyl]-
4-[8-(N'-phenyl-piperazino)-octyl]-
4-[8-(N'-o-chlorophenyl-piperazino)-octyl]-
4-[8-(N'-m-chlorophenyl-piperazino)-octyl]-
4-[8-(N'-p-chlorophenyl-piperazino)-octyl]-
4-[9-(N'-o-chlorophenyl-piperazino)-nonyl]-
4-[9-(N'-m-chlorophenyl-piperazino)-nonyl]-
4-[9-(N'-p-chlorophenyl-piperazino)-nonyl]-
4-[10-(N'-phenyl-piperazino)-decyl]-
4-[10-(N'-o-chlorophenyl-piperazino)-decyl]-
4-[10-(N'-m-chlorophenyl-piperazino)-decyl]-
4-[10-(N'-p-chlorophenyl-piperazino)-decyl]-
1-methyl-4-(N'-phenyl-piperazino)-methyl-
1-methyl-4-(N'-o-chlorophenyl-piperazino)-methyl-
1-methyl-4-[N'-m-chlorophenyl-piperazino)-methyl-
1-methyl-4-(N'-p-chlorophenyl-piperazino)-methyl-
1-methyl-4-[2-(N'-phenyl-piperazino)-ethyl]-
1-methyl-4-[2-(N'-m-chlorophenyl-piperazino)-ethyl]-
1-methyl-4-[2-(N'-p-chlorophenyl-piperazino)-ethyl]-
1-methyl-4-[4-(N'-phenyl-piperazino)butyl]-
1-methyl-4-[4-(N'-o-chlorophenyl-piperazino)-butyl]-
1-methyl-4-[4-(N'-m-chlorophenyl-piperazino)-butyl]-
1-methyl-4-[4-(N'-p-chlorophenyl-piperazino)-butyl]-
1-benzyl-4-(N'-o-chlorophenyl-piperazino)-methyl-
1-benzyl-4-(N'-m-chlorophenyl-piperazino)-methyl-
1-benzyl-4-(N'-p-chlorophenyl-piperazino)-methyl-
1-benzyl-4-[2-(N'-phenyl-piperazino)-ethyl]-
1-benzyl-4-[2-(N'-o-chlorophenyl-piperazino)-ethyl]-
1-benzyl-4-[2-(N'-m-chlorophenyl-piperazino)-ethyl]-
1-benzyl-4-[2-(N'-p-chlorophenyl-piperazino)-ethyl]-
1-benzyl-4-[4-(N'-o-chlorophenyl-piperazino)-butyl]-
1-benzyl-4-[4-(N'-m-chlorophenyl-piperazino)-butyl]-
1-benzyl-4-[4-(N'-p-chlorophenyl-piperazino)-butyl]-
3,5-dimethyl-4-(N'-phenyl-piperazino)-methyl-
3,5-dimethyl-4-[4-(N'-phenyl-piperazino)-butyl]-
3,5-dimethyl-4-[4-(N'-o-chlorophenyl-piperazino)-butyl]-
1,3,5-trimethyl-4-[2-(N'-phenyl-piperazino)-ethyl]-
1-ethyl-3,5-dimethyl-4-[2-(N'-phenyl-piperazino)-ethyl]-
1-phenyl-3,5-dimethyl-4-[2-(N'-phenyl-piperazino)-ethyl]-

EXAMPLE 14

Various suitable pharmaceutical preparations were made and administered to mammals. In place of the listed effective pyrazoles, it is also possible to incorporate other compounds embraced by Formula I, as well as the acid addition salts thereof, into similar preparations.

Example A.—Tablets

4-[3-(N'-phenylpiperazino)-propyl]-pyrazole-trihydrochloride

| | Parts by weight |
|---|---|
| Above compound | 10 |
| Lactose | 70 |
| Potato starch | 10 |
| Talc | 7 |
| Magnesium stearate | 1 |
| Highly dispersed silicic acid | 2 |

The above components are vigorously mixed and made up in tablet form in the usual manner. Each tablet contains 10 mg. of the active pyrazole derivative.

Example B.—Dragees

4-[2-(N'-phenyl-piperazino)-ethyl]-pyrazole-

| | Parts by weight |
|---|---|
| trihydrochloride | 15 |
| Lactose | 80 |
| Talc | 4 |
| Highly dispersed silicic acid | 1 |

The above components are thoroughly mixed and pressed into dragee cores in the usual manner. The cores are conventionally coated with sugar-syrup until the total weight of one dragee amounts to 200 mg. Each dragee contains 15 mg. of the effective pyrazole derivative.

Example C.—Syrup

The syrup is prepared from:

1-methyl-4-[3-(N'-o-chlorophenyl-piperazino)-propyl]-pyrazole-

| | Kg. |
|---|---|
| Dihydrochloride | 2 |
| Cane sugar | 30 |
| Glycerin (twice distilled) | 50 |
| Methyl-p-hydroxy benzoate | 0.3 |
| Propyl-p-hydroxy benzoate | 0.2 |
| Aromatic substances, as desired. | |
| Water (distilled) | 420 |

One unit dosage contains 20 mg. of the active pyrazole derivative.

Example D.—Injection solution

A solution of 2 parts by weight of 4-[9-(N'-phenyl-piperazino)-nonyl] - pyrazole-trihydrochloride in 1998 parts by weight of distilled water is filled into 2-ml. ampoules, in such a manner that each ampoule contains 2 mg. active pyrazole derivative.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof can make various changes and modifications of the invention to adapt it to various usages and conditions. Consequently, such changes and modifications are properly, equitably, and intended to be, within the full range of equivalence of the following claims.

What is claimed is:

1. A member selected from the group consisting of a 4-(ω-piperazinoalkyl)-pyrazole of Formula I, and a physiologically acceptable acid addition salt thereof

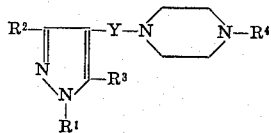

wherein $R^1$ represents H, alkyl of 1–4 carbon atoms, phenyl (lower)alkyl of 7–10 carbon atoms, phenyl and substituted phenyl wherein the substituents are 1 to 3 members selected from the group consisting of lower alkyl, lower alkoxy, phenyl, hydroxy, lower alkylmercapto, trifluoromethyl, halo, and methylene dioxy, $R^2$ and $R^3$ being identical or different, represent H or alkyl of 1–4 carbon atoms, $R^4$ represents alkyl of 1–6 carbon atoms, cycloalkyl and cycloalkenyl of 5–7 carbon atoms each, phenyl(lower) alkyl of 7–10 carbon atoms, Ar, or a cyclic residue selected from the group consisting of naphthyl, thienyl, pyridyl, thiazolyl, pyrazolyl, 2-pyrimidinyl, 2-benzimidazolyl, 2-benzoxazolyl, pyrazinyl, 3-pyridazinyl, isothiazolyl, 2- and 3-benzothienyl, 2-quinoxalyl, and quinolyl, said cyclic residue being optionally substituted by one lower alkoxy group or one to three lower alkyl groups, phenyl and substituted phenyl wherein the substituents are 1–3 members selected from the group consisting of lower alkyl, lower alkoxy, phenyl, hydroxy, lower alkylmercapto, trifluoromethyl, halogen atom, and methylene dioxy, and Y is alkylene of 1–10 carbon atoms.

2. A member as defined by claim 1 wherein Y represents $(CH_2)_n$ and $n$ is an integer in the range of 1–10 inclusive.

3. A member as defined by claim 1 wherein
Y represents $(CH_2)_n$,
$R^1$ is H, methyl, ethyl, benzyl or phenyl,
$R^2$ is hydrogen or methyl,
$R^3$ is hydrogen or methyl,
$R^4$ is methyl, ethyl, cyclohexyl, benzyl, phenyl, or substituted phenyl wherein the substituent on the phenyl is methyl, ethyl, phenyl, methoxy, methylenedioxy, hydroxy, methylmercapto, trifluoromethyl, F, Cl, Br or I, 1-naphthyl, 2-naphthyl, 2-thienyl, 3-thienyl, 2-pyridyl, 3-pyridyl, 4-pyridyl, or 4-methyl-2-thiazolyl, and $n$ is an integer in the range of 1–10 inclusive.

4. A member as defined by claim 1 wherein
Y represents $(CH_2)_n$ and $n$ is an integer in the range of 1–10 inclusive, and
$R^1$ is H, methyl or phenyl,
$R^2$ and $R^3$ each represent hydrogen, and
$R^4$ is methyl, benzyl, phenyl, p-tolyl, p-methoxyphenyl, o-chlorophenyl, m-chlorophenyl, p-chlorophenyl, p-methylmercaptophenyl, m-trifluoromethylphenyl, 2-thienyl, 3-thienyl, 2-pyridyl, or 4-methyl-2-thiazolyl.

5. A member as defined by claim 3 wherein $R^1$, $R^2$ and $R^3$ each represents H.

6. A member as defined by claim 4, wherein $R^1$ represents H.

7. A member as defined by claim 1, wherein
Y represents $(CH_2)_w$ and $w$ is an integer in the range of 1–4 inclusive, and
$R^1$, $R^2$ and $R^3$ each represents H, and
$R^4$ is phenyl, o-chlorophenyl, or p-chlorophenyl.

8. A member as defined by claim 1 wherein said 4-(ω-piperazinoalkyl)-pyrazole is 4-[2-(N'-phenylpiperazino)-ethyl]-pyrazole.

9. A member as defined by claim 1, wherein said 4-(ω-piperazinoalkyl pyrazole is 4-[2-(N'-o-chlorophenyl-piperazino)-ethyl]-pyrazole.

10. A member as defined by claim 1 wherein said 4-(ω-piperazinoalkyl)-pyrazole is 3,5-dimethyl-4-[2-(N'-phenyl-piperazino)-ethyl]-pyrazole.

11. A member as defined by claim 1, wherein said 4-(ω-piperazinoalkyl)-pyrazole is 3,5-dimethyl-4-[2-(N'-o-chlorophenyl-piperazino)-ethyl]-pyrazole.

12. A member as defined by claim 1 wherein said 4-(ω-piperazinoalkyl)-pyrazole is 1-methyl-4-[2-(N'-phenyl-piperazino)-ethyl]-pyrazole.

13. A member as defined by claim 1 wherein said 4-

(ω-piperazinoalkyl)-pyrazole is 4-[3-(N′-phenyl-piperazino)-propyl]-pyrazole.

14. A member as defined by claim 1 wherein said 4-(ω-piperazinoalkyl)-pyrazole is 4-[3-(N′-pyridyl-(2)-piperazino)-propyl]-pyrazole.

15. A member as defined by claim 1 wherein said 4-(ω-piperazinoalkyl)-pyrazole is 4-[3-(N′-o-chlorophenyl-piperazino)-propyl]-pyrazole.

16. A member as defined by claim 1 wherein said 4-(ω-piperazinoalkyl)-pyrazole is 4-[3-(N′-m-trifluoromethyl-phenyl-piperazino)-propyl]-pyrazole.

17. A member as defined by claim 1 wherein said 4-(ω-piperazinoalkyl)-pyrazole is 4-[3-(N′-p-methoxyphenyl-piperazino)-propyl]-pyrazole.

18. A member as defined by claim 1 wherein said 4-(ω-piperazinoalkyl)-pyrazole is 1-methyl-4-[3-(N′-o-chlorophenyl-piperazino)-propyl]-pyrazole.

19. A member as defined by claim 1 wherein said 4-(ω-piperazinoalkyl)-pyrazole is 4-[4-(N′-phenyl-piperazino)-butyl]-pyrazole; 4-[5-(N′-phenyl-piperazino)-pentyl]-pyrazole; 4-[7-(N′-phenyl-piperazino)-heptyl]-pyrazole; or 4-[9-(N′-phenyl-piperazino)-nonyl]-pyrazole.

20. A member as defined by claim 1 wherein $R^4$ represents alkyl of 1–6 carbon atoms, cycloalkyl and cycloalkenyl of 5–7 carbon atoms each, phenyl(lower)alkyl of 7–10 carbon atoms, phenyl, substituted phenyl, wherein the substituents are 1 to 3 members selected from the group consisting of lower alkyl, lower alkoxy, phenyl, hydroxy, lower alkylmercapto, trifluoromethyl, halo and methylene dioxy, naphthyl, thienyl, pyridyl, 6-methoxy-2-pyridyl, 2-thiazolyl, 4-methyl-2-thiazolyl, 1,3,5-trimethyl-4-pyrazolyl, or 6-methoxy-8-quinolyl.

21. A member as defined by claim 1 wherein said 4-(ω-piperazinoalkyl)-pyrazole is 1-methyl-4-[2-(N′-o-chloro-phenyl-piperazino)-ethyl]-pyrazole.

References Cited

Jones: J. Amer. Chem. Soc., vol. 71 (1949) pp. 3994–4000.

Jones et al.: J. Amer. Chem. Soc., vol. 75 (1953) pp. 4048–4052.

Finar et al.: J. Chem. Soc., London (1954), pp. 2293–98.

HENRY R. JILES, *Primary Examiner.*